July 16, 1957     J. J. NICHTA     2,799,075
MACHINE TOOL

Filed Jan. 22, 1953     5 Sheets-Sheet 1

INVENTOR.
JOHN J. NICHTA
ATTORNEYS

July 16, 1957

J. J. NICHTA 2,799,075

MACHINE TOOL

Filed Jan. 22, 1953

INVENTOR.
JOHN J. NICHTA
BY Hudson, Boughton,
Williams, David & Hoffmann.
ATTORNEYS

INVENTOR.
JOHN J. NICHTA

July 16, 1957  J. J. NICHTA  2,799,075
MACHINE TOOL
Filed Jan. 22, 1953 5 Sheets-Sheet 5

INVENTOR.
JOHN J. NICHTA
BY Hudson, Boughton,
Williams, David & Hoffmann
ATTORNEYS United States Patent Office 2,799,075
Patented July 16, 1957

2,799,075

MACHINE TOOL

John J. Nichta, Parma, Ohio, assignor to The Warner & Swasey Company, Cleveland, Ohio, a corporation of Ohio Application January 22, 1953, Serial No. 332,631

3 Claims. (Cl. 29—41)

This invention relates to a machine tool and more particularly to an improvement in the mechanism or mechanisms shown in Dixon Patent 2,007,564, July 9, 1935, for imparting rapid traverse and feeding movements to a slide or slides.

In the construction disclosed in said Dixon patent the commencement of the rapid traverse forward movements and of the feeding movements of the slide or slides occur always in the same fixed location and at the same fixed distance from the work holding chuck. On the other hand, in the construction referred to the feeding movements of the slides for different lengths of feed terminate at different and variable distances from the work holding chuck of the machine. This results in the necessity of providing substantial overhang of the work piece with respect to the work holding chuck or in mounting the tools upon the slides by means of compensating overhanging tool supports.

Any substantial overhang of the work piece from the chuck or any substantial overhang of the tools with respect to the slides on which they are mounted is undesirable in that stresses occur during machining operations which detract from the efficiency of operation of the machine and which limit the depth and speed of machining cuts that can be made. In addition, the tooling of the machine is made more complicated by the necessity of providing the compensating overhanging supports for the tools and thus adds to the setup time for the machine and increases production costs in its operation.

An object of the invention is to provide in a machine tool mechanism of the type shown in said Dixon Patent 2,007,564 for imparting rapid traverse and feeding movements to the slides but wherein the mechanism is constructed so as to eliminate undesirable overhang of the work with respect to its chuck and undesirable overhang of the tools with respect to their slides, thus improving the efficiency of the machine and facilitating the tooling and setup thereof with a consequent reduction in set-up time and operating costs.

Another object is to provide a mechanism such as referred to in the last object and wherein the feeding movements of the slides will all terminate at the same fixed location or distance from the work holding chuck, thus reducing to a minimum the overhang of the work piece with respect to the chuck and avoiding the necessity of employing compensating overhanging tool supports for mounting the tools on the slides.

Still another object is to provide a mechanism such as referred to in the preceding objects and wherein the tool slides can be caused to terminate their feeding movements at the same fixed and predetermined distance from the work holding chuck, notwithstanding that said mechanism employs non-adjustable and non-interchangeable cams for producing the rapid traverse and feeding movements of the slides.

In the prior art mechanisms of the type referred to and wherein the feeding movements of the slides terminate at different variable distances from the work holding chuck it is necessary to provide means for adjusting the cutoff tool longitudinally of the machine toward and away from the chuck to cut off the finished work pieces at varying distances from the work holding chuck.

A further object of the invention is to provide in a mechanism of the type referred to for imparting rapid traverse and feeding movements to the slides of a machine tool, means for terminating different length feeding movements of the slides at the same fixed predetermined distance from the work holding chuck and thus enabling the cutoff tool to be mounted always in substantially the same location irrespective of the length of the work piece to be cut off.

Further and additional objects and advantages not hereinbefore referred to will become apparent hereinafter during the detailed description of an embodiment of the invention which is to follow and which embodiment is illustrated in the accompanying drawings forming part of this specification and wherein.

Figure 9:
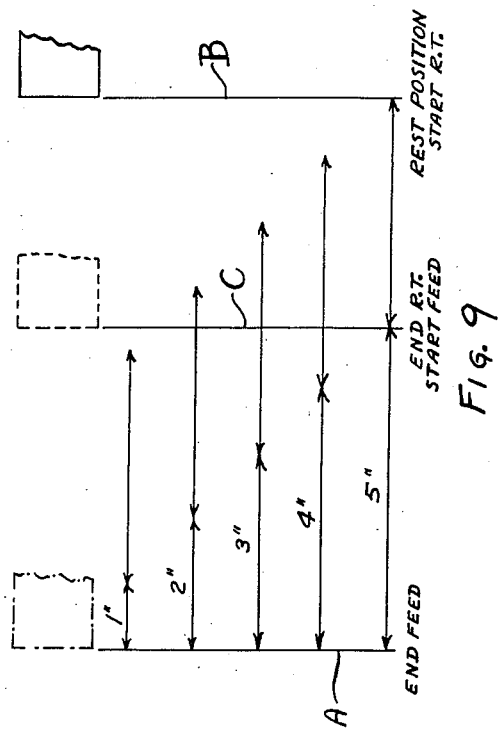

Fig. 9 (sheet 2) is a diagrammatic illustration of the functioning of the mechanism embodying the invention for moving the slides in rapid traverse and feeding movements and illustrates diagrammatically the condition that the commencements of the rapid traverse forward movements and of the feeding movements of the slide occurs at variable locations depending on the length of the feeding movement while the termination of the feeding movements of the slide occurs at the same fixed distance or location with respect to the work holding chuck regardless of the length of the feeding movement.

Figure 10:
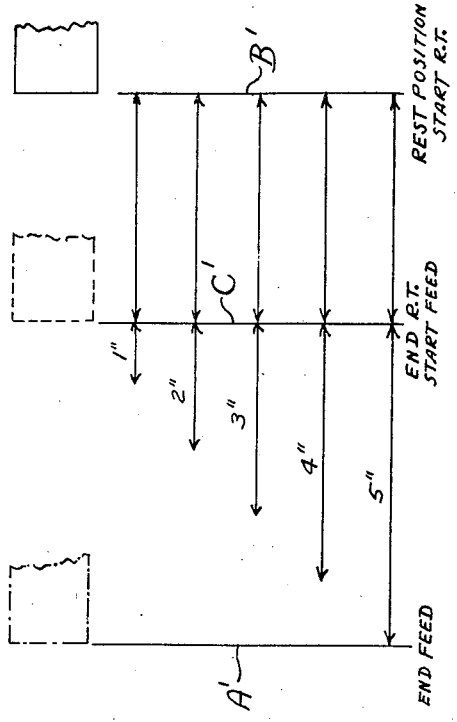

Fig. 10 is a view similar to Fig. 9 but illustrates diagrammatically the functioning of a similar mechanism of the prior art wherein the rapid traverse forward and the feeding movements of the slide commence in the same fixed locations for different feeding movement lengths while the different length feeding movements thereof terminate at different and variable locations or distances from the work holding chuck.

Figures 2, 11, 12:
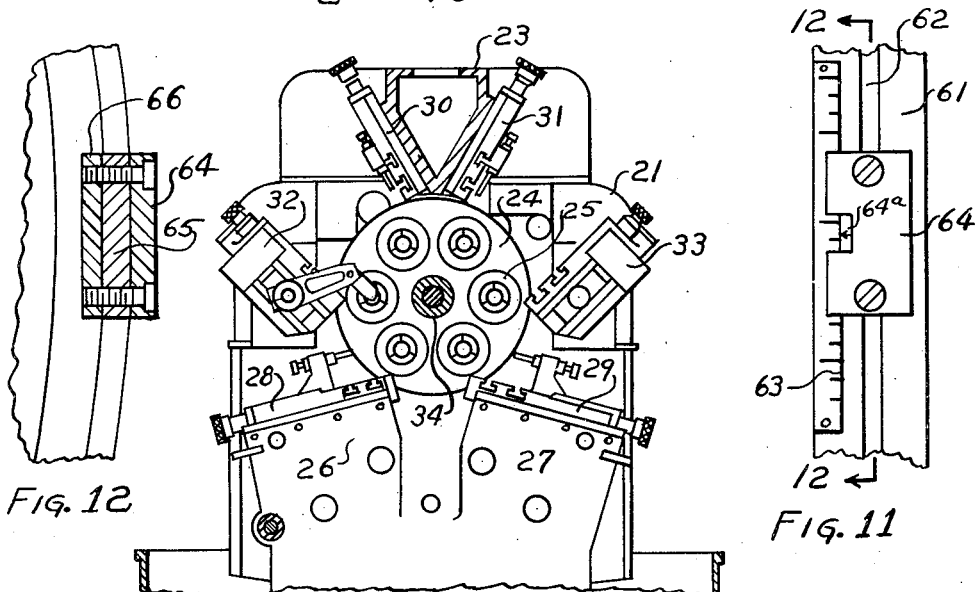
Fig. 2 is a vertical sectional view taken substantially on line 2—2 of Fig. 1 looking in the direction of the arrows.
Figure 6:
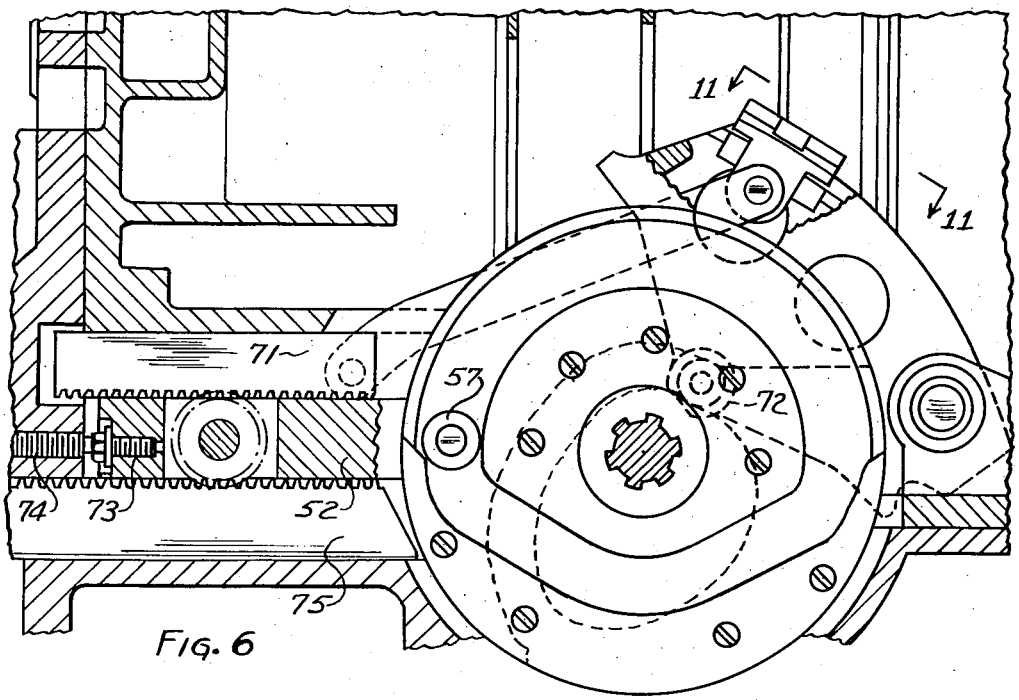
Fig. 6 (sheet 5) is a view similar to Fig. 5 but with parts of the mechanism in the relationship they occupy at the end of the rapid traverse forward movement and the start of the feeding movement of the slide.

Fig. 11 (sheet 1) is a fragmentary plan view of a portion of the rocking lever arm of the mechanism and is taken looking from line 11—11 of Fig. 6 and Fig. 12 (sheet 1) is a sectional view taken substantially on line 12—12 of Fig. 11 looking in the direction of the arrows.

Figure 1:
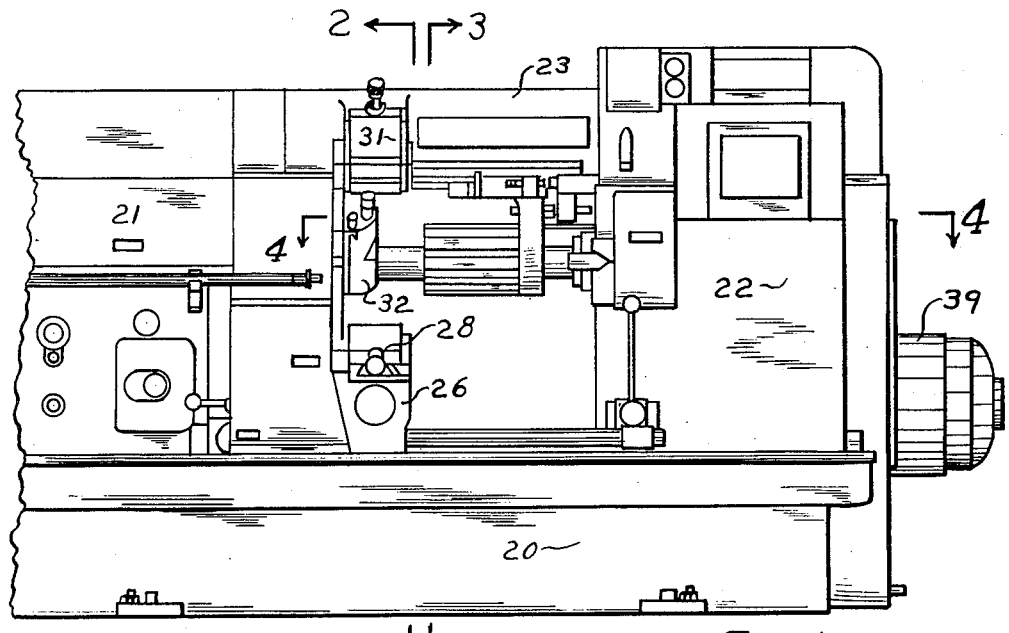
Fig. 1 is a fragmentary front elevational view of a multiple spindle automatic machine tool, such as a lathe, embodying the present invention.
Figure 3:
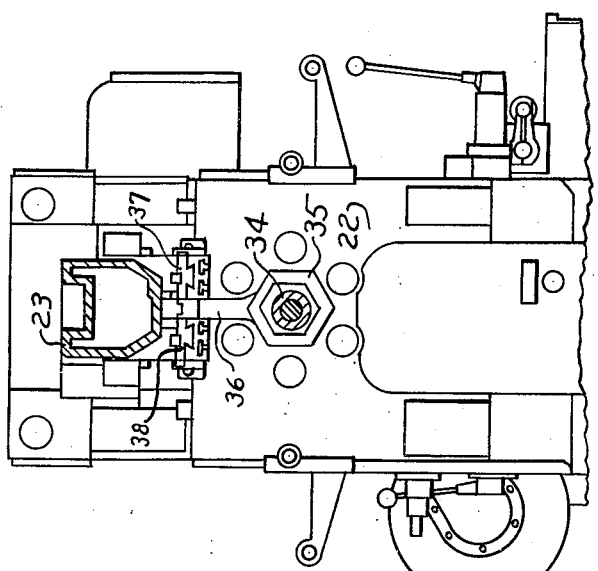
Fig. 3 (sheet 2) is a vertical sectional view taken substantially on line 3—3 of Fig. 1 looking in the direction of the arrows.

Figs. 1, 2 and 3 of the drawings illustrate a multiple spindle automatic machine tool in which mechanism embodying the present invention may be advantageously employed for actuating various of the slides of the machine as, for instance, the slides which move longitudinally of the machine, although of course the mechanism can be employed for moving other of the slides.

The automatic multiple spindle machine tool illustrated in Figs. 1, 2 and 3 comprises a base 20 from which extend upwardly in spaced relationship a headstock 21 and a supporting housing 22 with the headstock and housing interconnected at their upper ends by a horizontally extending beam structure 23, all as will be understood.

As is common in multiple spindle automatic machines of this type, the headstock 21 mounts the indexible spindle carrier 24 which supports a plurality of spindles 25, each of which is provided with a suitable work holding chuck as will be well understood in the art. In the particular multiple spindle machine illustrated six such spindles are shown but it will be understood that this number is simply by way of illustration. It will also be understood that the headstock 21 contains suitable mechanism for indexing the spindle carrier 24 and for locking the same in each indexed position but such mechanism is not illustrated inasmuch as it is well known in the art and forms no part of the present invention.

The headstock 21 at its right hand end, as viewed in the drawings, and adjacent its lower portion is provided with front and rear cross slide supporting extensions 26 and 27 on the upper ends of which are located the front and rear lower cross slides 28 and 29 as well understood in the art.

The beam 23 adjacent the headstock mounts the front and rear upper cross slides 30 and 31 also as well understood in the art. The right hand end of the headstock 21 adjacent the front of the machine mounts an intermediate front cross slide 32 which usually is provided with a cut off tool. In addition, the end of the headstock 21 may mount a rear intermediate cross slide 33, as will be well understood in the art.

It will be understood that suitable mechanism is provided within the headstock for actuating the slides 28, 29, 30, 31, 32 and 33 and this mechanism may be of any known form or it may be mechanism embodying the present invention.

As is usual in multiple spindle automatic machine tools of this type a horizontally extending supporting post 34 coaxial with the spindle carrier 24 extends from the headstock to the housing 22 and slidably supports the central tool slide 35 which moves longitudinally of the machine toward and away from the headstock 21.

The central longitudinally moving tool slide 35 is shown in this instance as of hexagonal configuration, thus providing six tool supporting faces. The central longitudinal tool slide 35 is provided with an upwardly extending arm 36 which has its upper end suitably guided and connected to an actuating bar movably supported in the housing 22 and forming a part of the mechanism embodying the present invention and which slide actuating bar will later be referred to.

The housing 22 and the beam 23 are also provided with suitable ways for the front longitudinally movable slide 37 and the rear longitudinally movable slide 38. The slides 37 and 38 are connected to slide actuating bars later to be referred to and forming part of the mechanism embodying the present invention.

The construction of the multiple spindle automatic machine tool shown in Figs. 1 to 3 inclusive and thus far set forth is well known in the art and hence only has been described briefly since per se it forms no part of the present invention and may take various forms. It is probably well to state that the headstock 21 and the housing 22 mount suitable power driven drive trains and mechanism for indexing and locking the spindle carrier 24 and for actuating the various slides and other parts of the machine, except as the longitudinally movable slides 35, 37 and 38 are described as actuated by mechanism embodying the present invention.

It will also be understood that all of the drive trains and operating mechanisms in the machine may be driven from a suitable power source as, for instance, they may be driven by a main motor 39.

Figure 4:
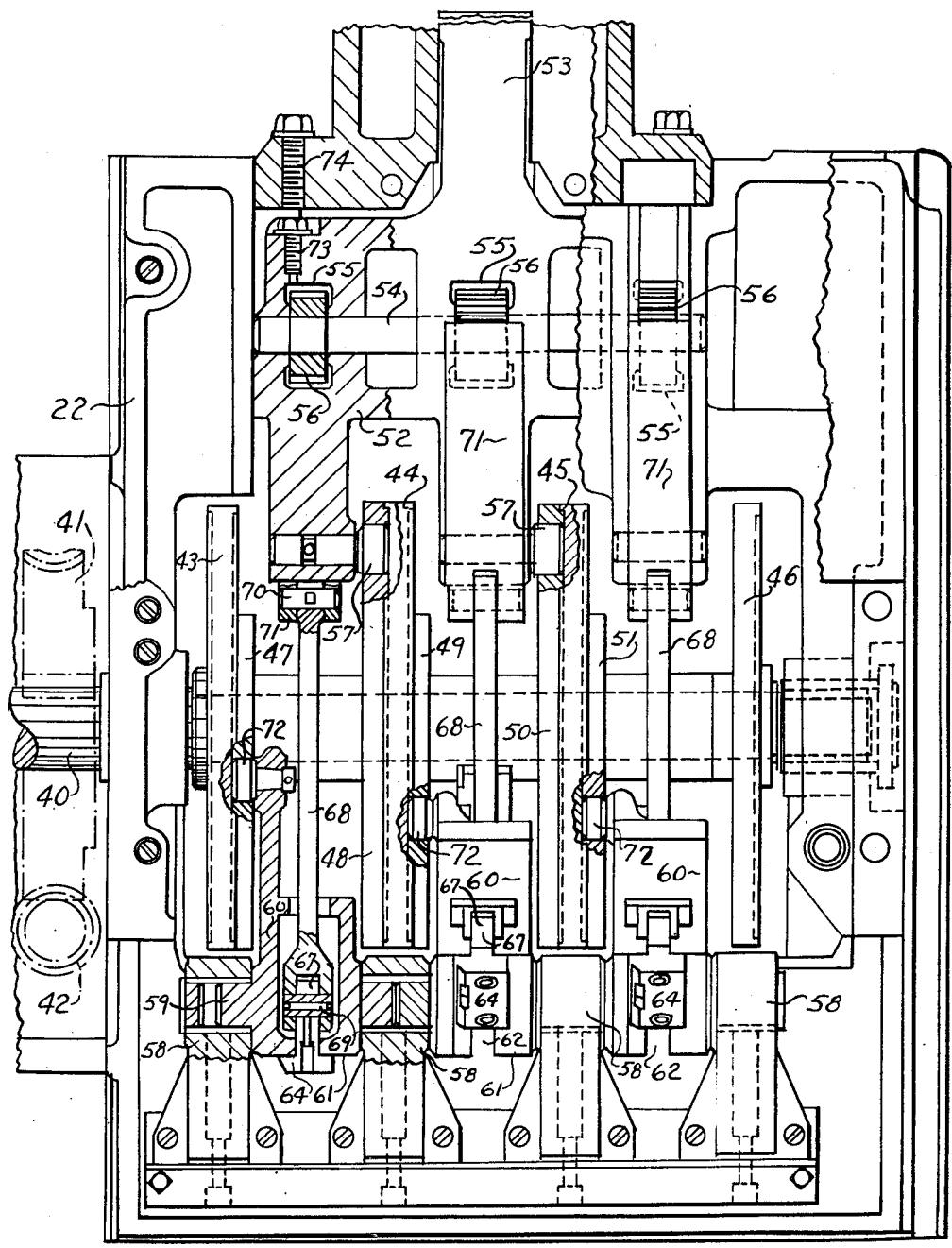
Fig. 4 (sheet 3) is a horizontal sectional view on an enlarged scale taken substantially on line 4—4 of Fig. 1 looking in the direction of the arrows.

The mechanism embodying the present invention in this instance is located within the housing 22 and is utilized for actuating the longitudinal slides and such mechanism is shown in Fig. 4 which is substantially a horizontal sectional view taken on line 4—4 of Fig. 1.

A horizontally extending cam shaft 40 is rotatably supported in the housing 22 by suitable bearings and extends from front to rear of the machine. The cam shaft 40 is driven in proper timed relationship to the other parts of the machine by a suitable drive train from the power source of the machine tool and which train, for instance, may include the worm wheel 41 keyed to the cam shaft 40 and meshing with a worm 42. Fixed on the cam shaft 40 and spaced axially thereof are cam-supporting disks 43, 44, 45 and 46 reading from left to right of Fig. 4.

The cam supporting disk 43 on its right hand face, as viewed in Fig. 4, has secured to it the front longitudinal slide feed cam 47 which is provided with a suitable cam groove later to be referred to. In Fig. 4 no cam is shown as secured to the other face of the cam supporting disk 43, but it will be understood that in certain instances a cam might be secured thereto capable of performing a desired function as, for instance, a six position threading and reeming cam might be secured to the left hand face of the disk 43.

The cam supporting disk 44 has secured to its left hand face, as viewed in Fig. 4, a fast motion cam 48 and is provided with a cam groove while on the other face of the supporting disk 44 there is secured the feed cam 49 for the longitudinally moving central slide 35 which, it will be recalled, is the hexagonal tool slide that moves on the post 34. It will be understood that the feed cam 49 also is provided with a suitable cam groove.

The cam supporting disk 45 mounts on its left hand face as viewed in Fig. 4, a fast motion cam 50 that is identical to the fast motion cam 48 mounted on the disk 44. The right hand face of the cam supporting disk 45 has fixed to it the feed cam 51 for the rear longitudinally moving slide 38 and also is provided with a suitable cam groove.

In Fig. 4 no cams are illustrated as mounted on the cam supporting disk 46 but it will be understood that a fast motion cam identical with the fast motion cams 48 and 50 could be mounted on the left hand face of the disk 46 while any desired purpose cam could be mounted on the right hand face thereof as for instance, a third position threading and reeming cam.

A pinion block 52 is mounted in the housing 22 for horizontal sliding reciprocating movement therein being guided for such movement at its front and rear ends and by a central longitudinally extending guiding tongue 53 all engaged by suitable guiding portions of the housing. The pinion block 52 fixedly mounts a shaft 54 which extends from front to rear of the block and passes through pinion receiving chambers 55 spaced axially of the shaft 54 and wherein are pinions 56 that are freely rotatably mounted on the shaft 54 for a purpose later to be pointed out.

The sliding pinion block 52 is provided with spaced arms two of which are shown as mounting roller cam followers 57 that cooperate with the cam grooves of the fast motion cams 48 and 50. It will be understood that the third arm of the block 52 similarly could mount a roller cam follower that would cooperate with a fast motion cam secured to the left hand face of the cam supporting disk 46 as viewed in Fig. 4, if this was desired, but inasmuch as the block 52 is an integral structure it is only necessary to connect the same operatively with the two fast motion cams 48 and 50.

Figure 5:
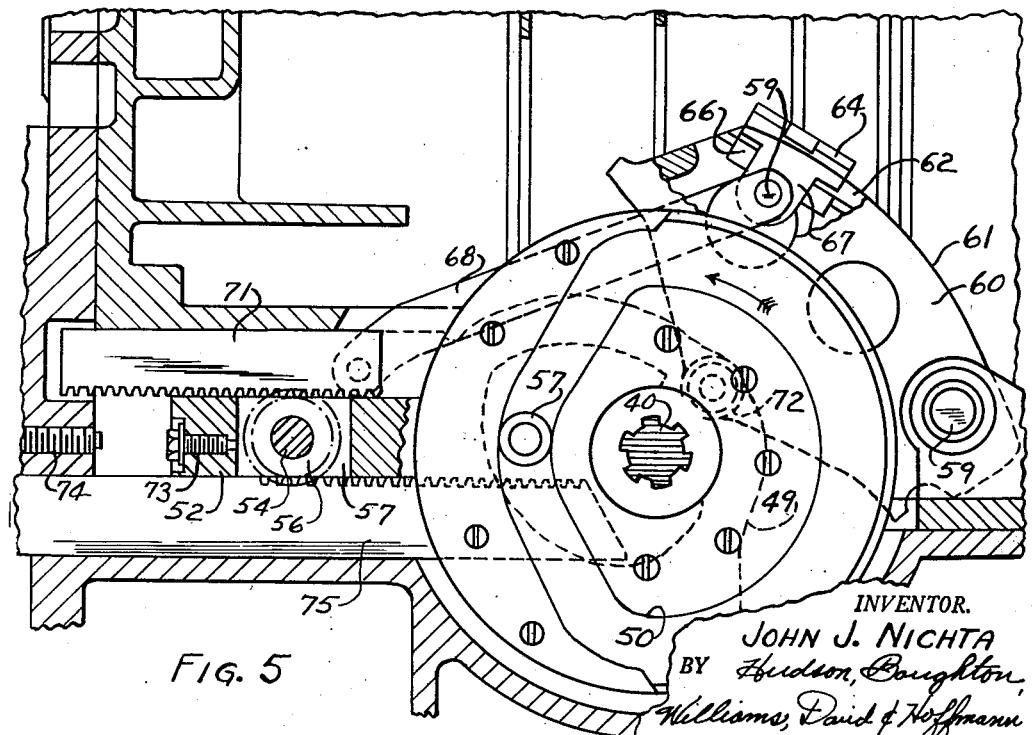
Fig. 5 (sheet 4) is a sectional view showing the mechanism for moving one of the slides, with the parts of the mechanism in the relationship they occupy when the slide is in its most rearward position prior to starting its rapid traverse forward movement.

The housing 22 is provided with aligned spaced bearing supports 58 which rockably support the trunnions 59 on opposite sides of three rocker arms 60, see Figs. 4 and 5. The rocker arms 60 are each provided with an arcuate or quadrant surface 61 which centrally thereof has formed therein a concentric lengthwise slot 62 while along one side of the slot 62 the arcuate surface 61 of each rocker arm is provided with scale graduations indicated at 63 in Fig. 11.

In each slot 62 is a connecting member that can be adjusted lengthwise of the slot to any desired position therein as indicated by the scale graduations and then clamped in its adjusted location. This connecting member comprises a block-like portion 64 located on the outer side of the arcuate or quadrant arm surface 61 of the rocker arm and a post portion 65 that extends through the slot 62 and into the interior of the rocker arm. The post 65 on its inner end has a clamping portion 66 and there is provided suitable means for drawing the portions 64 and 66 together to clamp the connecting member in adjusted position to the rocker arm 60, such adjusted position being determined by the scale 63 on the arcuate surface 61 and the pointer mark 64a on the portion 64.

Each of the connecting members formed of the portions 64 and 66 and post 65 further includes a tongue portion 67 that extends between the tines of the forked end of a link 68 and which mounts a pivot pin 69 that pivotally connects the tongue portion 67 with the link 68. Each link 68 at its end opposite to its forked end mounts a pivot pin 70 and extends between spaced apart end portions of a rack bar 71 slidably supported in the housing 22 and which rack bar hereinafter will be designated as the upper rack bar. The pivot pin 70 pivotally connects the link 68 to the upper rack bar 71, wherefore swinging or rocking movement of the rocker quadrant arm 60 by its respective feed cam 47, 49 or 51 between its outer or inner limits of rocking movement effects linear sliding movement of the upper rack bar 71 between its rearward or forward limits of movement.

Figure 7:
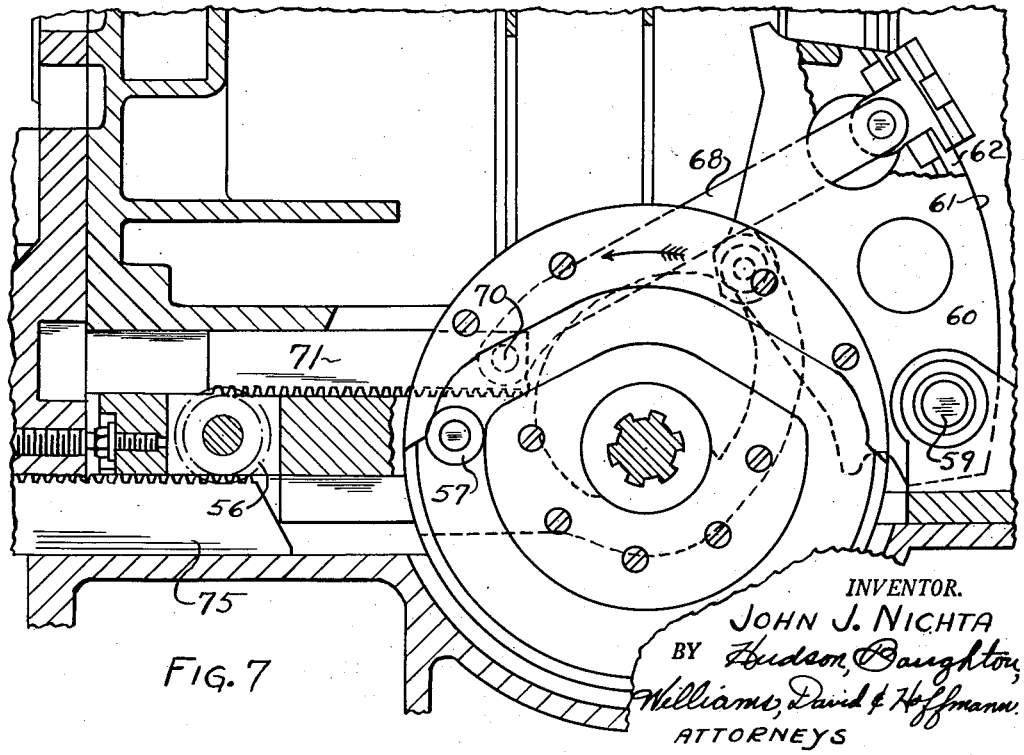
Fig. 7 is a view similar to Figs. 5 and 6 but shows the relationship between the parts of the mechanism as it exists when the slide has reached the end of its feeding movement or its most forward movement.

It will be noted that when the upper rack bar 71 is in its most rearward or right hand position and the rocker arm 60 is in its most outward or right hand position, as viewed in Fig. 7, then the pivot pin 70 that interconnects the link 68 with the rack bar 71 forms the true center for the arc or curvature of the arcuate or quadrant surface 61 of the rocker arm 60 and thus at such time the connecting member for the other end of the link 68 can be adjusted lengthwise of the slot 62 without any linear movement being imparted to the rack bar 71. The importance of this last mentioned fact will be pointed out in greater detail hereinafter.

It will be understood by reference to Fig. 4 that each of the three rocker or quadrant arms 60 is connected by a link 68 to an upper rack bar 71 that is slidable in suitable guides in the housing 22 and which is located immediately over the slidable block 52 with each rack bar meshing with a pinion 56 carried by the sliding block 52.

In Fig. 4 the left hand rocker arm or quadrant 60, link 68, and upper rack bar 71 form part of the mechanism for actuating the front longitudinal slide 37 of the machine tool while the corresponding most right hand parts shown in Fig. 4 constitute part of the actuating mechanism for the rear longitudinal slide 38. The middle rocker arm or quadrant 60, link 68 and upper rack bar 71 of Fig. 4 constitute part of the mechanism for actuating the central or hexagonal longitudinal slide 35.

Each rocker arm or quadrant 60 has an inwardly extending portion which mounts a roller cam follower 72 with the right and left hand roller cam followers 72 shown in Fig. 4 cooperating, respectively, with the cam grooves of the front longitudinal slide feed cam 47 and the rear longitudinal slide feed cam 51, while the middle roller cam follower 72 cooperates with the cam groove of the longitudinal central slide feed cam 49.

It will be understood that rotation of the cams 47, 49 and 51 will cause rocking movements to be imparted to the rocker arms 60 or said arms will be held stationary depending upon the contour of the cam grooves and the resultant will be linear movements of the upper rack bars 71 or said rack bars will be held stationary as the case may be.

Reference to Fig. 4 will further indicate that the forward or (as viewed in Fig. 4) the upward movement of the slide bock 52 is limited by the engagement of the head of an abutment screw 73 carried by the slide block 52 with the end of an abutment screw 74 carried by the housing 22. This engagement between the abutment screws occurs to limit further forward movement of the slide block 52 at the end of the feeding movements of the longitudinal slides 37, 38 and 35.

In Figs. 5, 6 and 7 of the drawings only one upper rack bar 71, pinion 56, link 68 and rocker arm or quadrant is shown but it will be understood that the disclosures of these figures hold good for the actuating mechanism shown in Fig. 4 for either the front and rear longitudinal slides 37 and 38 or for the middle longitudinal slide 35. For descriptive purposes it will be assumed that the unit disclosed in Figs. 5, 6 and 7 is the actuating unit for the middle or hexagonal longitudinal tool slide and hence the roller cam follower 72 travels in the cam groove of the feed cam 49 while the roller cam follower 57 of the slide block 52 travels in the cam groove of the fast motion cam 50.

Each of the pinions 56 carried by the slide block 52 meshes with a slide actuating or lower rack bar 75 which has its forward end, i. e., its left hand end as viewed in Figs. 5, 6 and 7, operatively connected to a longitudinal slide and hence the two outer lower rack bars 75 are connected to the front and rear longitudinal slides 37 and 38 while the middle rack bar 75 is connected to the middle or hexagonal longitudinal tool slide 35. It may be assumed that the lower rack bar 75 shown in Figs. 5, 6 and 7 is operatively connected to the middle or hexagonal longitudinal slide 35.

The relationship of the parts of the slide actuating mechanism shown in Fig. 5 is that which they occupy when the slide 35 is in its most rearward position, at which time the slide actuating rack bar 75 and the pinion block 52 are in their most rearward or right hand position, the rack bar 71 is in its most forward or left hand position and the rocker arm 60 is in its most inward or left hand position. The cam shaft 40 and the motion cam and feed cam, in this instance the cams 50 and 49, rotate at all times in a counterclockwise direction.

Starting from the relationship of the parts shown in Fig. 5 during the operation of the machine tool a 90° counterclockwise rotation of the cam 50 moves the roller cam follower 57 and the slide block 52 forwardly or toward the left its full limit of movement from the position shown in Fig. 5 to the position shown in Fig. 6 with the abutment screws 73 and 74 in contact. The simultaneous rotation of the feed cam 49 through 90° imparts no rocking movement to the rocker arm 60 and no movement to the upper rack bar 71 since the roller cam follower 72 at this time will be moving in a true circular portion of the cam groove of the feed cam 49. Consequently during the transition in the relationship of the parts from that occupied in Fig. 5 to that occupied in Fig. 6 the upper rack bar 71 remains stationary in its most forward position while the slide block 52 moves from its most rearward or right hand position to its most forward or left hand position. Such movement of the slide block 52 causes the pinion 56 to roll along the stationary upper rack bar 71 and to impart forward rapid traverse movement to the lower rack bar 75 which moves toward the left from the position shown in Fig. 5 to the position shown in Fig. 6. Such movement of the lower rack bar 75 imparts forward rapid traverse movement to the particular slide to which it is connected, it being assumed in this instance that it is connected to the middle hexagonal or longitudinal slide 35.

The relationship of the parts of the slide actuating mechanism as indicated in Fig. 6 is that which they occupy at the end of the rapid traverse forward movement and the start of the feeding movement of the slide. When the relationship of the parts of the slide actuating mechanism varies from that shown in Fig. 6 to that shown in Fig. 7 then the rapid motion cam 50 and the feed cam 49 have rotated further counterclockwise 180°. Such rotation of the rapid motion cam 50 imparts no linear movement to the slide block 52, since during this entire rotation the roller cam follower 57 is traveling in a true circular portion of the cam groove of the rapid motion cam 50. However, during this 180° counterclockwise rotation of the feed cam 49 the roller cam follower 72 is traveling in an eccentric or cam portion of the cam groove of the feed cam 49 and this effects outward rocking movement of the rocker arm or quadrant 60 from its most inward or left hand position, as shown in Figs. 5 and 6, to its most outward or right hand position as shown in Fig. 7. This rocking movement of the rocker arm or quadrant 60 is transmitted by the link 68 into rearward or right hand linear movement of the upper rack bar 71 from the position shown in Fig. 6 to the position shown in Fig. 7. This rearward linear movement of the upper rack bar 71 rotates the pinion 56 on the now stationary slide block 52 and the rotation of the pinion 56 imparts slow forward feeding or left hand movement to the lower rack bar 75 and to the slide to which the lower rack bar is connected, in this instance the middle or hexagonal longitudinal tool slide 35. Therefore it will be understood that the relationship of the parts of the slide actuating mechanism as shown in Fig. 7 is that which they occupy at the end of the feeding movement of the slide.

It will be noted that the pivotal connection 70 between the link 68 and the upper rack bar 71 in the relationship shown in Fig. 7 constitutes the true center of curvature of the arcuate or quadrant surface 61 of the rocker arm 60. Consequently the connecting member for operatively connecting the link 68 with the rocker arm 60 can be unclamped and adjusted lengthwise of the slot 62 at this time without any motion being imparted to the upper rack bar 71. It will be appreciated that this adjustment is made for the purpose of varying the length of feeding movement of the slide and since it is made when the slide is always in its most forward position at the end of its feeding movement then every feeding movement of the slide will terminate at the same point or location and thus variable length feeding movements can be imparted to the slide, but such movements will terminate always at the same fixed location or distance from the work holding chuck. Of course, the commencement of the variable length feeds and the termination of the rapid traverse forward movements of the slide will be at different locations depending upon the length of feeding movement, but this is immaterial and it is extremely advantageous to have the variable length feeding movements all terminate at the same fixed location with respect to the work holding chuck for reasons hereinbefore set forth and which will later be referred to.

Following the termination of the feeding movement of the slide a still further 90° counterclockwise rotation of the cam 50 will cause the roller cam follower 57 and the slide block 52 to move rearwardly or to the right from the position shown in Fig. 7 to the position shown in Fig. 5. Also this 90° counterclockwise rotation of the cam 49 will cause the rocker arm or quadrant 60 to rock inwardly from its most outward position as shown in Fig. 7 to its most inward position as shown in Fig. 5 and which will act through the link 68 to move the upper rack bar 71 from the position shown in Fig. 7 to the position shown in Fig. 5, that is said rack bar will be moved forwardly or toward the left and in the opposite direction to the movement of the slide block 52. Consequently the oppositely moving upper rack bar 71 and slide block 52 cause the pinion 56 to impart accelerated rearward movement to the lower side actuating rack bar 75 from the position shown in Fig. 7 to the position shown in Fig. 5 and such movement of the lower rack bar 75, in turn, imparts rearward rapid traverse movement to the slide.

As previously mentioned, the relationship of the parts of the slide actuating mechanism as shown in Fig. 7 is that which exists when the slide has reached the end of its feeding movement. It will be recalled that at this time the pivotal connection 70 between the link 68 and the upper rack bar 71 constitutes the true center of curvature for the arcuate surface 61 of the rocker or quadrant arm 60 and hence at this time the operative connection between the link 68 and the rocker or quadrant arm can be adjusted lengthwise of the slot 62 without imparting movement to the upper rack bar 71. The adjustment just referred to provides for different lengths of feed for the slide.

Reference to Fig. 9 of the drawing shown in the diagram illustrated therein that with the construction hereinbefore described the variable feed lengths shown therein and identified as 1 inch, 2 inch, 3 inch, 4 inch and 5 inch feed lengths all terminate at the same fixed position represented by the line A, while the start of the rapid traverse movements forward and the start of the feeding movements are at variable distances with respect to the positions represented by the lines B and C. Inasmuch as the feeding movements all terminate at the same fixed distance from and close to the work chucks of the spindles a decided advantage is present in the construction hereinbefore described over the prior art constructions.

The present construction eliminates any substantial overhang of the work piece from the chuck or any substantial overhang of the tools with respect to the slides on which they are mounted and hence reduces or eliminates undesirable stresses which might otherwise occur during the machining operations and which would detract from the efficiency of operation of the machine and would limit the depth and speed of the machine cuts that could be made. In addition, the tooling of the machine is simplified as the necessity of providing compensating overhanging supports for the tools is avoided and this means that the setup time for the machine is reduced with a resultant reduction in production costs in its operation. Also, there will be no necessity to adjust the position of the cutoff tool for different lengths of feeding movement since the latter all terminate at the same point.

Figure 8:
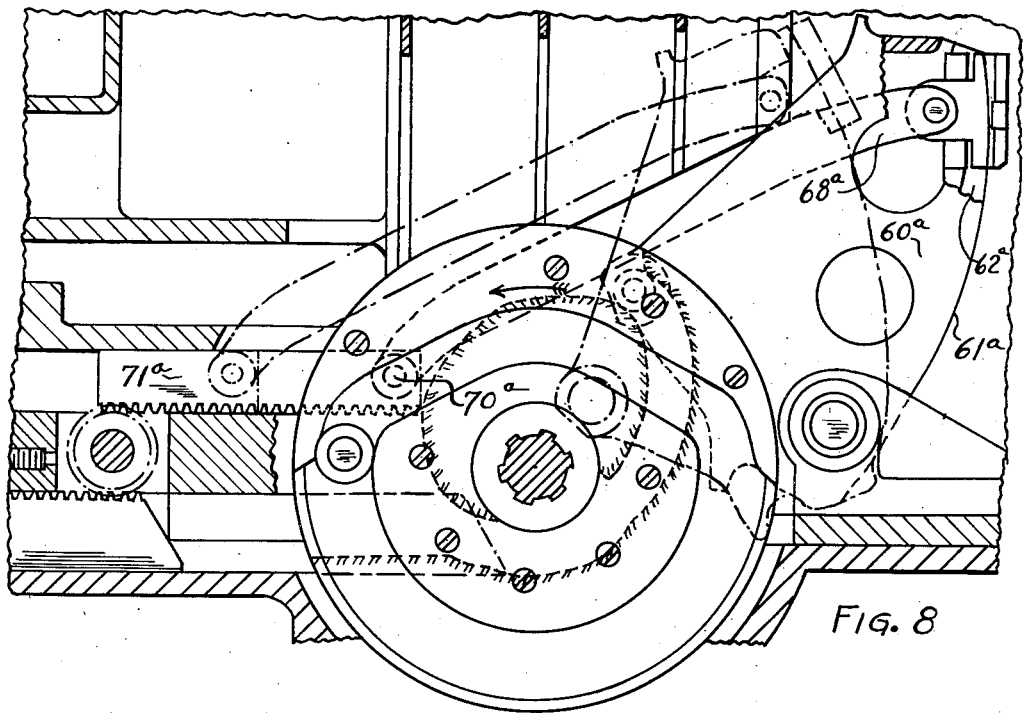
Fig. 8 (sheet 4) is a view similar to Fig. 7 but illustrates an arrangement of the prior art and also shows by means of dash and dot lines the relationship of certain of the parts of the mechanism when the slide has reached the end of its rapid traverse forward movement and is to commence its feeding movement.

In order to more adequately and clearly bring out the advantages resulting in the construction embodying the invention over the prior art constructions references is now made to Figs. 8 and 10 of the drawings which illustrate a prior art construction and show diagrammatically its functional limitations. Fig. 8 is a view similar to Fig. 7 but illustrating a prior art construction, namely, a construction following the teachings of said Dixon Patent 2,007,564. Fig. 8, as does Fig. 7 with respect to the present invention, illustrates the relationship between the parts of the slide actuating mechanism of the prior art as it exists when the slide has reached the end of its feeding movement. The elements of the construction shown in Fig. 8 which are correlated to the elements of the construction shown in Fig. 7 have had the same reference numerals applied thereto with the exponent *a* added.

It will be noted in Fig. 8 that the link 68a which connects the upper rack bar 71a with the rocker arm 60a is illustrated in full lines in the position it occupies at the end of the feeding movement, at which time the rocker arm 60a is in its most outwardly rocked position also as indicated by full lines. It will be observed that at this time the pivotal connection 70a between the link 68a and the upper rack bar 71a is eccentric with respect to the arcuate surface 61a of the rocker arm 60a and hence the connecting means between the link 68a and the rocker arm 60a cannot be adjusted longitudinally of the slot 62a in the rocker arm without imparting linear movement to the upper rack bar 71a. It is only when the rocker arm 60a has been rocked to its most inward position, as indicated by dot and dash lines in Fig. 8, and the parts are in the relationship they have at the start of the feeding movement that the pivotal connection 70a between the link 68a and the upper rack bar 71a constitutes the true center of curvature for the arcuate surface 61a of the rocker arm. Under the condition just referred to the connecting means between the rocker arm and the link 68a can now be adjusted longitudinally of the slot 62a without imparting linear movement to the upper rack bar 71a. Consequently in the construction shown in Fig. 8 variable lengths of feed will have their feeding movements commencing at the same location but terminating at different distances or locations with respect to the work chuck of the spindles.

The differences between the construction shown in Fig. 8 and the construction embodying the present invention are clearly brought out by reference to the diagram of Fig. 10 as compared to Fig. 9. It will be seen that in the Fig. 8 construction the rapid traverse forward movements all start at the line B' and terminate at the line C' where all of the different length feeding movements commence. It will further be noted that the different length feeding movements represented as 1 inch, 2 inch, 3 inch, 4 inch and 5 inch terminate at different distances from the line A'. Consequently in the construction illustrated in Fig. 8 there must be substantial overhang of the work piece from the chuck and substantial overhang of the tools with respect to the slides on which they are mounted, particularly for the shorter length feeds. This results in lowering the efficiency of the machine, limiting the depth and speed of the machining cuts and increasing the setup operations and time by the necessity of providing the compensating overhanging supports for the tools.

Although a preferred embodiment of the invention has been illustrated and described herein it will be understood that the invention is susceptible of various modifications and adaptations within the scope of the appended claims.

Having thus described my invention, I claim:

1. In an actuating mechanism for a slide of a machine tool and of the type having spaced parallel slidably reciprocating rack bars one of which is operatively connected to the slide, a slidably reciprocating pinion carrier intermediate said rack bars to move parallel to and in the same directions as the latter and provided with a pinion intermeshing with both rack bars, a cam operatively connected to said pinion carrier to impart reciprocating movement thereto or to hold the same stationary in a predetermined position, a rocker arm, a second cam for rocking said arm, said arm having an arcuate surface, means adjustable lengthwise of said arcuate surface to vary the length of feeding movement of the slide and capable of being clamped in adjusted position, and a link pivotally connected at one end to said means and at its other end to the other of said rack bars; the improvement which comprises having the center of curvature of said arcuate surface coincident with the axis of the pivotal connection between said link and said other rack bar when said one rack bar is in its most forward position and said other rack bar is in its most rearward position at the termination of the feeding movement of the slide, wherefore at such time said adjustable means can be adjusted lengthwise of said arcuate surface of the rocker arm to vary the length of feeding movement imparted to the slide by the mechanism but with the feeding movements of variable length all terminating at the same location.

2. The improvement in an actuating mechanism for a slide of a machine tool as defined in claim 1 and which includes the feature that said arcuate surface of said rocker arm is eccentric to the axis of the pivotal connection between said link and said other rack bar when said one rack bar is in its most rearward position and said other rack bar is in its most forward position at the termination of the rearward movement of the slide.

3. The improvement in an actuating mechanism for a slide of a machine tool as defined in claim 1 and which includes the feature that said arcuate surface of said rocker is concentric to the axis of the pivotal connection between said link and said other rack bar when said one rack bar is in its most forward position and said other rack bar is in its most rearward position at the termination of the feeding movement of the slide but is eccentric to the axis of the pivotal connection between said link and said other rack bar at all other times in the movements of the slide and in the relationship between said rack bars, rocker arm and link.

References Cited in the file of this patent

UNITED STATES PATENTS 2,007,564    Dixon _____ July 9, 1935